United States Patent
Yu et al.

(10) Patent No.: US 10,115,952 B2
(45) Date of Patent: Oct. 30, 2018

(54) POROUS SEPARATOR HAVING INVERSE OPAL STRUCTURE FOR SECONDARY BATTERY AND METHOD FOR MANUFACTURING THE SAME

(71) Applicant: LG CHEM, LTD., Seoul (KR)

(72) Inventors: Hyung-Kyun Yu, Daejeon (KR); Seok-Koo Kim, Daejeon (KR); Bo-Kyung Ryu, Daejeon (KR); Jong-Hun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 182 days.

(21) Appl. No.: 14/771,720

(22) PCT Filed: Oct. 31, 2014

(86) PCT No.: PCT/KR2014/010392
§ 371 (c)(1),
(2) Date: Aug. 31, 2015

(87) PCT Pub. No.: WO2015/065121
PCT Pub. Date: May 7, 2015

(65) Prior Publication Data
US 2016/0013464 A1    Jan. 14, 2016

(30) Foreign Application Priority Data

Oct. 31, 2013 (KR) .................. 10-2013-0131521
Oct. 31, 2014 (KR) .................. 10-2014-0150290

(51) Int. Cl.
*H01M 2/18* (2006.01)
*H01M 2/16* (2006.01)
(Continued)

(52) U.S. Cl.
CPC ............. *H01M 2/1686* (2013.01); *C08J 9/26* (2013.01); *H01M 2/145* (2013.01);
(Continued)

(58) Field of Classification Search
None
See application file for complete search history.

(56) References Cited

U.S. PATENT DOCUMENTS

2003/0105270 A1*  6/2003  Lindsay ............... C08G 73/06
                                                    528/170
2010/0137124 A1*  6/2010  Liu .................... B01D 67/0093
                                                    502/4
(Continued)

FOREIGN PATENT DOCUMENTS

CN    102340010 A    2/2012
EP    2 749 588 A1   7/2014
(Continued)

OTHER PUBLICATIONS

Wikipedia: Dispersion chemistry (https://en.wikipedia.org/w/index.php?title=Dispersion_(chemistry)&oldid=486766045) as published on Apr. 11, 2012 (Year: 2012).*
(Continued)

*Primary Examiner* — Jeremiah R Smith
(74) *Attorney, Agent, or Firm* — Birch, Stewart, Kolasch & Birch, LLP

(57) ABSTRACT

The present disclosure provides a porous separator substrate with an inverse opal structure obtained by using an engineering plastic resin with high heat-resistance, and a manufacturing method thereof. In the method, a non-crosslinked polymer resin is used to form an opal structure and a crosslinked polymer resin is penetrated into the opal structure and an organic solvent is used to remove the polymer particles being used to form the opal structure, thereby manufacturing a porous substrate with an inverse opal structure. According to the present disclosure, a separator having good porosity and air permeability can be provided without the problems of heat-resistance decrease, pore closing and thickness decrease.

6 Claims, 2 Drawing Sheets

(51) Int. Cl.
*H01M 2/14* (2006.01)
*C08J 9/26* (2006.01)
*H01M 10/052* (2010.01)

(52) U.S. Cl.
CPC ... *H01M 2/1653* (2013.01); *C08J 2201/0462* (2013.01); *C08J 2205/044* (2013.01); *C08J 2371/08* (2013.01); *C08J 2379/08* (2013.01); *C08J 2381/04* (2013.01); *C08J 2381/06* (2013.01); *H01M 2/14* (2013.01); *H01M 2/16* (2013.01); *H01M 2/18* (2013.01); *H01M 10/052* (2013.01)

(56) References Cited

U.S. PATENT DOCUMENTS

| 2010/0233258 | A1* | 9/2010 | Jan | A61K 9/2072 424/465 |
|---|---|---|---|---|
| 2014/0370358 | A1 | 12/2014 | Hong et al. | |
| 2015/0056494 | A1 | 2/2015 | Honda | |

FOREIGN PATENT DOCUMENTS

| JP | 2000-260413 A | 9/2000 |
|---|---|---|
| JP | 2003-2687 A | 1/2003 |
| JP | 2011-60539 A | 3/2011 |
| JP | 2012-190547 A | 10/2012 |
| KR | 10-2008-0109237 A | 12/2008 |
| KR | 10-2011-0003786 A | 1/2011 |
| KR | 10-2012-0122020 A | 11/2012 |
| KR | 10-2013-0008153 A | 1/2013 |
| KR | 10-2013-0066746 A | 6/2013 |
| WO | WO 2013/051468 A1 | 11/2013 |

OTHER PUBLICATIONS

Abstract corresponding to Cassagneau et al., "Semiconducting Polymer Inverse Opals Prepared by Electropolymerization," Advanced Materials, vol. 14, Issue 1, Jan. 4, 2002, (Abstract only of Cassagneau considered) (Year: 2002).*

International Search Report, issued in PCT/KR2014/010392, dated Feb. 26, 2015.

Chen, X. et al, "Fabrication of closed-cell polyimide inverse opal photonic crystals with excellent mechanical properties and thermal stability," J. Mater. Chem., Mar. 19, 2008, vol. 17, pp. 2262-2267.

Tian, Y. et al, "Formation of deformed honeycomb-patterned films from fluorinated polyimide," Polymer, Feb. 15, 2007, vol. 48, pp. 2338-2344.

* cited by examiner

POROUS SEPARATOR HAVING INVERSE OPAL STRUCTURE FOR SECONDARY BATTERY AND METHOD FOR MANUFACTURING THE SAME

TECHNICAL FIELD

This application claims priority to Korean Patent Application No. 10-2013-0131521 filed in the Republic of Korea on Oct. 31, 2013 and Korean Patent Application No. 10-2014-0150290 filed in the Republic of Korea on Oct. 31, 2014, which are incorporated herein by reference. The present disclosure relates to a separator for an electrochemical device and a manufacturing method thereof, more specifically a porous separator for an electrochemical device, comprising a porous substrate having uniform size and form of pores and a method for manufacturing the same.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices capable of charging and discharging, particular a lithium secondary battery. Also, a recent trend of developing the lithium secondary battery is to design a new electrode and battery capable of improving capacity density and specific energy.

Among currently available secondary batteries, lithium secondary batteries developed in the early 1990's have drawn particular attention due to their advantages of higher operating voltages and much higher energy densities than conventional batteries using an aqueous electrolyte, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause a short circuit between a cathode and an anode.

In order to solve the above safety problems of electrochemical devices, a separator comprising a porous coating layer obtained from inorganic particles and a binder polymer has been proposed. Such a separator has been conventionally prepared by coating a slurry of inorganic particles and a binder polymer on the surface of an active material layer which is obtained as a porous membrane applied on a plate, in which the binder polymer is penetrated into the pores of the active material layer to render the active material layer ununiform. In this regard, Korean Patent Application Publication No. 2008-0109237 discloses a method of preparing an electrode by applying a solvent in advance prior to the formation of a porous coating layer to prevent the penetration of a binder polymer. In this case, there is a still problem that the application of the solvent reduces a filling density and a rough surface is formed.

DISCLOSURE

Technical Problem

Accordingly, the present disclosure is designed to solve the above-mentioned problems, and therefore it is directed to providing a porous separator having high porosity and good ionic conductivity which can be used in an electrochemical device. Also, another object of the present disclosure is to provide a porous substrate having an inverse opal structure that is environment-friendly without no treatment of hydrofluoric acid, unlike a convention process using silica or titania; a manufacturing method thereof; and a separator using the porous substrate.

Other objects and advantages of the present disclosure will be understood by the following description, and it is understood that these can be achieved by means, methods or a combination thereof which are defined in the claims.

Technical Solution

The present disclosure provides a porous substrate for an electrochemical device which can achieve the above objects, and a manufacturing method thereof. The porous substrate of the present disclosure has an inverse opal structure, and a method for manufacturing the same comprises preparing a colloid solution containing polymer particles (S10); coating the colloid solution on a substrate to form a coating layer of the polymer particles with an opal structure (S20); dispersing a polymer resin in a first organic solvent to obtain a polymer resin dispersion (S30); filling the opal structure of the polymer particles with the polymer resin dispersion (S40); and melting the polymer particles with a second solvent (S50).

In the present disclosure, the polymer particles may be a non-crosslinked polymer, and the polymer resin may be a crosslinked polymer.

In the present disclosure, the polymer particles may be selected from the group of consisting of syrene-butadiene rubber (SBR), polybutadiene rubber, polychloroprene (neoprene), nitrile rubber, acryl rubber, fluorinated rubber (FKM), polyvinyl chloride (PVC), polystyrene, polymethylmethacrylate (PMMA), acrylonitrile-butadiene-styrene (ABS), polyvinylidene fluoride, polyvinyl fluoride, polytetrafluoroethylene (PTFE), polyvinyl acetate or a copolymer thereof, vinylacetate-ethylene copolymer, and a mixture thereof.

In the present disclosure, the polymer particles have a diameter of 0.1 to 1 µm.

In the present disclosure, the polymer resin may be an engineering plastic resin with high heat-resistance.

In the present disclosure, the engineering plastic resin with high heat-resistance may be selected from the group of consisting of polysulfone (PSF), polyethersulfone (PES), polyetherimide (PEI), polyphenylenesulfide (PPS), polyether ether ketone (PEEK), polyacrylate (PA), polyamideimide (PAI), polyimide (PI), and a mixture thereof.

In the present disclosure, the first organic solvent may be a chlorinated solvent.

In the present disclosure, the second organic solvent may be a solvent capable of melting the polymer particles selectively.

Also, the present disclosure provides an electrode assembly comprising a cathode, an anode, and a separator interposed between the cathode and the anode, and an electrochemical device comprising the electrode assembly.

In the present disclosure, the separator comprises a porous substrate manufactured by the above-mentioned method.

In addition, the present disclosure provides a porous substrate for an electrochemical device, which has an inverse opal structure and multiple pores in the inside and the surface thereof, and exhibits a pore diameter distribution with a standard deviation of 1% to 35%.

In the present disclosure, the pores have a diameter of 0.1 to 1 μm.

In the present disclosure, the porous substrate may comprise an engineering plastic resin with high heat-resistance.

In the present disclosure, the engineering plastic resin with high heat-resistance may be selected from the group of consisting of polysulfone (PSF), polyethersulfone (PES), polyetherimide (PEI), polyphenylenesulfide (PPS), polyether ether ketone (PEEK), polyacrylate (PA), polyamideimide (PAI), polyimide (PI), and a mixture thereof.

The engineering plastic resin with high heat-resistance may have a molecular weight of 100,000 to 10,000,000 Da.

The engineering plastic resin with high heat-resistance may be a linear polyimide or an aromatic heterocyclic polyimide comprising an imide group in the main chain.

In the present disclosure, the porous substrate may comprise a crosslinked polymer resin.

Advantageous Effects

The separator according to the present disclosure is produced by a manufacturing process of an inverse opal structure to have uniform pore size and pore form, and high porosity. Also, the separator has good ionic conductivity and air permeability as well as high porosity, without pore closing and thickness decrease. Finally, the manufacturing process of an inverse opal structure according to the present disclosure is environment-friendly and is harmless to humans since it needs no treatment of hydrofluoric acid.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. Meanwhile, the form, size, scale and proportion of elements in the drawings may be magnified so as to emphasize the explanation.

BEST MODE

Figure 1:
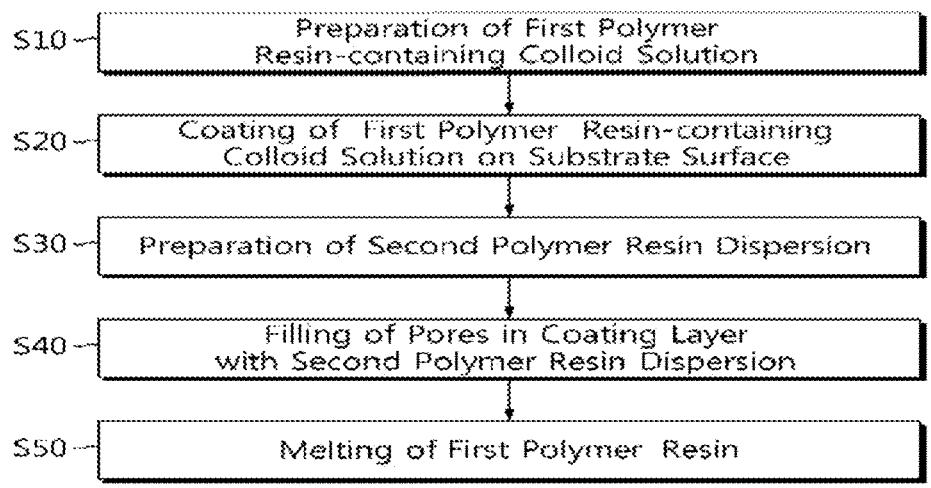
FIG. 1 is a flow chart for explaining the manufacturing process of a separator with an inverse structure according to the present disclosure.
Figure 2:
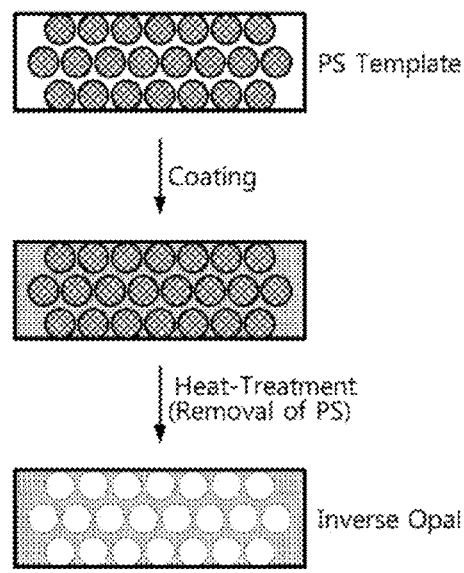
FIG. 2 schematically shows a conventional process of forming an inverse structure.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

The present disclosure provides a porous substrate with an inverse opal structure and a manufacturing method thereof.

Also, the present disclosure provides a separator comprising the porous substrate, and an electrochemical device comprising the separator.

A first aspect of the present disclosure is to provide a method for manufacturing a porous substrate with an inverse opal structure. The porous substrate with an inverse opal structure according to the present disclosure may be manufactured by forming an opal-structured template by using polymer particles, filling a polymer resin in the template, and melting the polymer particles with an organic solvent to remove the polymer particles.

FIG. 1 is a flow chart for explaining the manufacturing process of a separator with an inverse structure according to the present disclosure.

The present disclosure will be described in detail with reference to FIG. 1 below.

Firstly, a colloid solution containing polymer particles is prepared.

According to one embodiment of the present disclosure, the polymer particles are preferably a polymer having a degree of crosslinking less than 10%, or less than 5%, or less than 3%, or less than 1%, or a non-crosslinked polymer. The polymer that has a high degree of crosslinking is swelled, but not well melted, when it comes into contact with a solvent. Accordingly, in the following step which will be described below, the non-crosslinked polymer is preferably used as the polymer particles so that the polymer particles are melted by a solvent to remove an opal-structured template and form an inverse opal structure.

The degree of crosslinking may be calculated by the following equation (I):

$$\text{Degree of crosslinking(or Gel Fraction)}(\%) = B/A \times 100 \quad \text{(I)}$$

wherein A is a weight of a polymer used as polymer particles, and

B is a dry weight of a non-melting portion of the polymer obtained after A weight of the polymer is placed in a 200-mesh filter and immersed in ethyl acetate at room temperature for 72 hours.

In the present disclosure, polymer particles having a gel fraction less than less than 10%, or less than 5%, or less than 3%, or less than 1%, or non-crosslinked polymer particles are used for their easy removal by a solvent.

The polymer particles may be selected from the group of consisting of syrene-butadiene rubber (SBR), polybutadiene rubber, polychloroprene (neoprene), nitrile rubber, acryl rubber, fluorinated rubber (FKM), polyvinyl chloride (PVC), polystyrene, polymethylmethacrylate (PMMA), acrylonitrile-butadiene-styrene (ABS), polyvinylidene fluoride, polyvinyl fluoride, polytetrafluoroethylene (PTFE), polyvinyl acetate or a copolymer thereof, vinylacetate-ethylene copolymer, and a mixture thereof, but are not limited thereto if the polymer particles are stable after emulsion polymerization or suspension polymerization. For example, polymer particles of SBR may be obtained by polymerizing monomers of 1,3-butadiene and styrene in the presence of additives such as an emulsifier, a polymerization initiator, an electrolyte and a molecular weight modifier in water at about 30° C., while stirring them, by low-temperature emulsion polymerization. However, the preparation method of the polymer particles is not limited thereto and may be appropriately selected depending on the kinds of the polymer particles.

Considering the air permeability of the separator, the polymer particles may have a diameter of 0.1 to 1 μM, or 0.1 to 0.7 μm, or 0.2 to 0.5 μm. If the polymer particles fail to satisfy such diameter range, the finally obtained porous substrate with an inverse opal structure may have pores of an excessively small or large size and it is unfavorable in terms of air permeability and ionic conductivity when it is used in a separator for an electrochemical device. The size of the polymer particles may suitably varied depending on the desired uses or properties of the porous substrate and the separator comprising the same. That is, the size of the polymer particles may be suitably controlled considering various factors, including the air permeability, ionic conductivity, pore diameter and porosity of the porous substrate. In one embodiment of the present disclosure, the polymer particles exhibit a mono-modal diameter distribution. The polymer particles exhibit a diameter distribution with a standard deviation of 1% to 35%.

The polymer particles are present in a concentration of 1 to 50 wt % in the colloid solution, but the present disclosure is not limited thereto. Since the aqueous medium, such as water, in the colloid solution is removed in the following drying step as described below, it may be suitably controlled within the condition that does not excessively require drying time or heating temperature.

Next, the colloid solution is coated on a substrate and dried to form a coating layer of the polymer particles. The coating layer where the polymer particles are collected by forming an opal structure acts as a template for forming a porous substrate in the following step as described below.

In the present disclosure, the substrate refers to a support for forming the coating layer and is not particularly limited. According to a specific embodiment of the present disclosure, glass or silicon wafers are used as the substrate.

The colloid solution may be coated by various coating methods. Non-limiting examples of the coating methods may include knife coating, roll coating, curtain coating, cast coating, engrave roll coating, spary coating, foam coating, reverse roll coating, calendar coating, extrusion coating, dip coating and air-knife coating. In a specific embodiment of the present disclosure, the coating is preferably carried out by a dip coating method in which the substrate is dipped in the colloid solution.

The drying of the colloid solution may be carried out at normal pressure or under the condition of pressurization. If necessary, the drying may be carried out by applying heat or hot air to the substrate. Also, the drying may be carried out by using an oven, a gas furnace or an electric furnace. In a specific embodiment of the present disclosure, the drying may be carried out at a temperature of 25 to 100° C., preferably 50 to 80° C., but is not limited thereto. In this step, the time and the temperature of drying may be suitably selected depending on process conditions, including the concentration of the colloid solution and the kind of the polymer particles.

Figure 3:
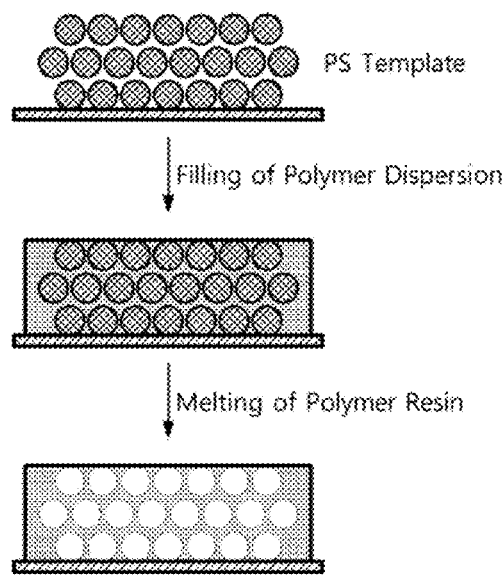
FIG. 3 schematically shows the manufacturing process of a separator with an inverse structure according to the present disclosure.
Figure 4:
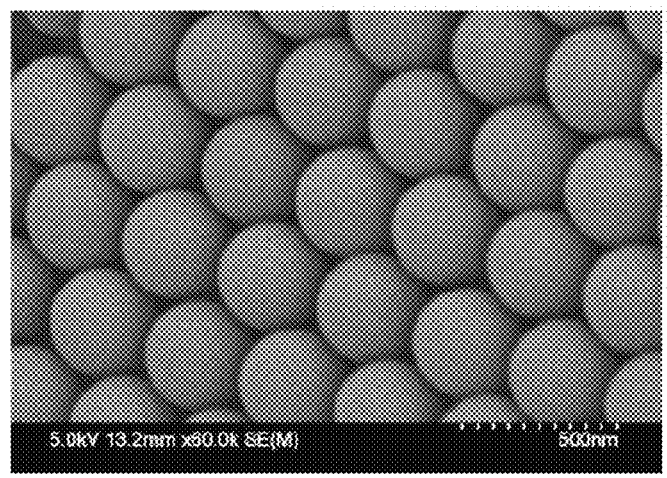
FIG. 4 shows the template of an inverse opal structure prepared in the manufacture of the separator of the present disclosure.

As the aqueous medium in the colloid solution is removed by drying, the polymer particles in the colloid solution are collected while forming an opal structure in the substrate. FIG. 3 schematically shows the manufacturing process of an inverse structure according to the present disclosure, which shows an example of the polymer particles collector with an opal structure, obtained after the aqueous medium is dried.

The collector with an opal structure comprise multiple pores formed among the polymer particles and acts as a template for forming an inverse opal-structured porous substrate made of a polymer resin in the following step as described below.

Sequentially, a polymer resin is dispersed in a first organic solvent to obtain a polymer resin dispersion. According to a specific embodiment of the present disclosure, the polymer particles comprise a crosslinked polymer. Since the polymer resin is used in the inverse opal-structured porous substrate of a separator, it is preferably a crosslinked polymer that is prevented from dissolution in an organic solvent or a polar solvent such as an electrolyte solution after a battery is assembled. According to a specific embodiment of the present disclosure, the polymer resin has a degree of crosslinking (or gel fraction) of 40% or higher, or 50% or higher, or 70% or higher, 80% or higher, or 90% or higher. The degree of crosslinking may be measured as described above.

Also, according to a specific embodiment of the present disclosure, the polymer resin may be an engineering plastic resin with high heat-resistance. The engineering plastic resin is characterized by having a heat-resistant temperature of 150° C. or higher, preferably 180° C. or higher, more preferably 200° C. or higher.

Conventional separators are a polyolefin film obtained by extruding a polyolefin resin, followed by stretching and relaxation, a non-woven polyolefin fabric obtained by processing the polyolefin resin in the form of a fiber. However, said polyolefin resin undergoes severe heat-shrinkage at a high temperature and has poor physical property. In order to solve such a problem, the present inventors have applied the engineering plastic resin having a heat-resistant temperature of 150° C. or higher, thereby providing a separator having little or no heat-shrinkage, or a heat-shrinkage ratio of 5% or less.

Meanwhile, when the engineering plastic resin with high heat-resistance is processed by a conventional method to prepare a porous membrane, it is not well melted or dissolved in most solvents and needs a high-temperature injection process, which is unfavorable in processability. However, the present disclosure applies a method of forming an inverse opal structure to the engineering plastic resin with high heat-resistance, thereby providing a porous separator having good ionic conductivity and air permeability.

According to a preferred embodiment of the present disclosure, the engineering plastic resin with high heat-resistance may be selected from the group of consisting of polysulfone (PSF), polyethersulfone (PES), polyetherimide (PEI), polyphenylenesulfide (PPS), polyether ether ketone (PEEK), polyacrylate (PA), polyamideimide (PAI), polyimide (PI), and a mixture thereof, but is not limited thereto. Preferably, the engineering plastic resin with high heat-resistance has a molecular weight of 100,000 to 10,000,000 Da, more preferably 500,000 Da or more.

According to a specific embodiment of the present disclosure, the engineering plastic resin with high heat-resistance may be a linear polyimide or an aromatic heterocyclic polyimide comprising an imide group in the main chain. Also, the engineering plastic resin may be a copolymer resin comprising a monomer having the imide group.

In one embodiment of the present disclosure, the first organic solvent may be a chlorinated solvent. Non-limiting examples of the chlorinated organic solvents may include chloroform, methylene chloride, carbon tetrachloride, carbon dichloride, ethane trichloride, vinyl chloride, ethylene dichloride, ethylene trichloride and ethylene teterachloride, and a mixture thereof.

Next, the polymer resin dispersion is filled in the opal structure of the polymer particles. The filling may be carried out by immersing the substrate coated with the template of the polymer particles in the polymer resin dispersion. According to a specific embodiment of the present disclosure, the substrate coated with the template of the polymer particles is immersed in a container of the polymer resin dispersion. Preferably, in order for the polymer resin dispersion to be penetrated into pores among particles, formed in the opal structure, the substrate is left for several minutes to several hours after immersing in the dispersion. The immersion may be carried out under the condition of pressurization for the effective penetration of the dispersion into the pores. After the polymer resin dispersion is penetrated into the pores of the opal structure, the substrate is taken out from the dispersion and dried to cure the polymer resin dispersion. The drying may be carried out at normal pressure or under the condition of pressurization. Since the polymer particles used in the opal-structured template has high solubility, the particles need to be stably maintained without melting or dissolving by a solvent contained in the polymer resin dispersion. For this, it is preferred that the drying is rapidly carried out by applying heat or hot air. According to a preferred embodiment of the present disclosure, the drying may be carried out by using an oven, a gas furnace or an electric furnace. The drying may be carried out at a temperature of 30 to 80° C., preferably 50 to 80° C. If the drying temperature exceeds 80° C., the polymer is heated above the glass transition temperature thereof to cause change in shape and property.

Then, the polymer particles are melted with a second solvent. The second organic solvent may be a solvent with high selectivity to the polymer particles, which can melt only the polymer particles selectively while not melting the polymer resin. The second organic solvent may be suitably selected depending on the polymer particles and the polymer resin used. In a specific embodiment of the present disclosure, the second organic solvent may be toluene, chloroform or NMP when the polymer particles are polystyrene or polymethacrylate.

According to a specific embodiment of the present disclosure, the polymer particles are melted by immersing the substrate filled with the polymer resin in the second organic solvent. Also, this step may be carried out at under the condition of heating for effective melting. The heating may be carried out at a temperature of 30 to 50° C., preferably 30 to 40° C.

Since the second solvent has the selectivity to the polymer particles, it melts only the polymer particles in the coating layer of polymer particles, without the melting of the polymer resin. Accordingly, the polymer particles forming an opal structure are melted and removed, thereby finally forming a porous substrate of the polymer resin that has an inverse opal structure.

A second aspect of the present disclosure is to provide a porous substrate manufacture by the above-mentioned method, and a separator for an electrochemical device, comprising the porous substrate.

The separator for an electrochemical device should have uniform pore distribution and uniform thickness because it contains an electrolyte solution and can conduct ionic conduction between a cathode and an anode. For example, if the thickness of a certain part of the separator is thinner than that of other parts, or if the porosity of a certain part of the separator is higher than that of other parts, ionic conductivity in the certain part becomes raised and current is concentrated in the certain part during charging/discharging processes. From this, an active material comes into contact with the certain part to preferentially start reaction, thereby generating large pore distribution in both directions in the state of charge (SOC). Such a distribution causes rapid deterioration of a battery to impair the stability and reliability of the battery. Particularly, poor performances such as current leakage may occur at high-current instantaneous discharge (10 seconds).

The porous substrate for a separator according to the present disclosure is obtained from an opal-structured template of polymer particles being collected in a regular pattern. Accordingly, the porous substrate manufactured by the method of the present disclosure has substantially high uniformity in the form, size and distribution of pores according to the regularity of the opal structure. Therefore, the porous substrate is used as a separator in a battery to provide to good resistance and high output and prevent current leakage even at high-current instantaneous discharge (10 seconds). According to a specific embodiment of the present disclosure, the porous substrate has pores with a diameter of 0.1 to 1 μm or 0.1 to 0.7 μm, or 0.2 to 0.5 μm. According to a specific embodiment of the present disclosure, the pore distribution in the porous substrate is within a standard deviation of 1% to 35%, preferably 1 to 20%. Since the diameter of the pores depends on the diameter of polymer particles used as the template, it is preferred that the polymer particles exhibit mono-modal diameter distribution for uniform pore distribution. Also, in the present disclosure, the porous substrate may have an air permeability of 50 to 800 sec/100 cc, or 100 to 500 sec/100 cc. In a specific embodiment of the present disclosure, the thickness of the porous substrate may range from 10 to 40 μm.

A third aspect of the present disclosure is to provide a separator comprising the porous substrate prepared by the above-mentioned method, an electrode assembly comprising the separator, and an electrochemical device comprising the electrode assembly. That is, in the electrochemical device, the separator of the present disclosure can be effectively used as a separator interposed between a cathode and an anode.

In the present disclosure, the separator comprises the porous substrate according to the present disclosure.

In a specific embodiment of the present disclosure, the separator comprises the substrate alone or a plurality of the substrates in a laminated form. The porous substrate may form a multi-layered laminate together with a porous film coated with a polyolefin resin by a dry or wet coating method. According to another aspect of the present disclosure, the separator may further comprise a porous coating layer of organic/inorganic composite obtained from a mixture of inorganic particles and a binder resin on at least one surface thereof. In the porous coating layer, the binder polymer resin allows the immobilization of the inorganic particles by way of dot bonding or face bonding, thereby maintaining the physical form of the coating layer and providing a porous structure with a plurality of micropores formed by interstitial volume of the inorganic particles. The porous coating layer has a thickness of 1 to 30 μm, or 1 to 20 μm, or 1 to 15 μm. The inorganic particles are not limited to their size, but it is preferred that the particles have a size of 0.001 to 10 μm so as for the coating layer to have a uniform thickness and a suitable porosity. In a specific embodiment of the present disclosure, the inorganic particles are present in an amount of 50 to 99 wt %, or 60 to 95 wt % based on 100 wt % of the porous coating layer.

The electrochemical device according to one aspect of the present disclosure may be any device in which electrochemical reactions may occur, and specific examples of the electrochemical devices include all types of primary batteries, secondary batteries, fuel cells, solar cells or capacitors such as a super capacitor device. In particular, among the secondary batteries, lithium secondary batteries including a lithium metal secondary battery, a lithium ion secondary battery, a lithium polymer secondary battery or a lithium ion polymer secondary battery are preferred.

The separator of the present disclosure may be used together with any electrode which is not particularly limited, and the electrode may be manufactured by binding an electrode active material to an electrode current collector according to one of common methods well known in the art. A cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any of those that are commonly used in anodes of conventional electrochemical devices. Non-limiting examples of the anode active material include metallic lithium, lithium alloys, and lithium intercalation materials such as carbon, petroleum coke, activated carbon, graphite and other carbonaceous materials. Non-limiting examples of a cathode current collector suitable for use in the electrochemical device of the present disclosure include aluminum foils, nickel foils and a combination thereof. Non-limiting examples of an anode current collector suitable for use in the electrochemical device of the present disclosure include copper foils, gold foils, nickel foils, copper alloy foils and a combination thereof.

The electrochemical device of the present disclosure can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $I^-$, $ClO^+$, $AsF_6^-$, $CH_3CO_2^-$, $CF_3SO_3^-$, $N(CF_3SO_2)^-$, $C(CF_2SO_2)_3^-$ and a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte may be introduced in any suitable step during the manufacturing of the electrochemical device depending on the manufacturing processes and desired physical properties of a final product. Specifically, the electrolyte may be introduced before battery assembly or in the final step of battery assembly.

The electrochemical device of the present disclosure is generally manufactured by winding the separator and the electrodes. Lamination (or stacking) and folding of the separator and the electrodes are also possible.

Mode for Disclosure

Hereinafter, various preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

Example 1

Polystyrene (PS) particles with an average diameter of 300 nm were dispersed on a glass substrate and dried in an oven at 70° C. to obtain a 30 μm-thick template film. Thereon, a solution of polyetherimide dispersed in methylene chloride (5 wt %) was applied and dried in the same oven for 5 minutes to obtain a film filled with a polymer resin. The film was washed with toluene under sonication for 10 minutes to remove the PS particles, thereby obtaining a membrane (porous substrate) having pores.

Comparative Example 1

Silica particles with an average diameter of 300 nm were dispersed on a glass substrate and dried in an oven at 70° C. to obtain a 30 μm-thick template film. Thereon, a solution of polyetherimide dispersed in methylene chloride (5 wt %) was applied and dried in the same oven for 5 minutes to obtain a film filled with polyetherimide. Then, the film was immersed in an HF solution for 1 hour, followed washing under sonication, thereby obtaining a membrane having pores.

Results

After removing the particles in Example 1 and Comparative Example 1, inverse opal structures of polyetherimide were obtained. It was confirmed that in the membrane of Example 1 using polystyrene particles, the particles were clearly removed on the surface, whereas the membrane of Comparative Example 1 using silica particles had small granules of the particles melted. Consequently, such membranes showed a body-centered cubic structure or a face-centered cubic structure, and as a result of analyzing the structures by the cross-section thereof, Example 1 exhibited a porosity of about 72%, while Comparative Example 1 exhibited a porosity of about 70%. That is, the porosity of Comparative Example 1 was lower than that of Example 1 even in the similar structure, and such a result is believed to be attributed by the agglomeration of the particles due to HF treatment.

What is claimed is:
1. A method for manufacturing a porous substrate with an inverse opal structure, comprising:
   preparing a colloid solution containing polymer particles (S10);
   coating the colloid solution on a substrate to form a coating layer of the polymer particles with an opal structure (S20);

dispersing a polymer resin in a first organic solvent to obtain a polymer resin dispersion (S30),
wherein the first organic solvent is methylene chloride,
wherein the polymer resin is a crosslinked polymer, and
wherein the polymer resin is an engineering plastic resin with high heat-resistance selected from the group consisting of polysulfone (PSF), polyethersulfone (PES), polyetherimide (PEI), polyphenylenesulfide (PPS), polyether ether ketone (PEEK), polyacrylate (PA), polyamideimide (PAI), polyimide (PI), and mixtures thereof;
filling the opal structure of the polymer particles with the polymer resin dispersion (S40); and
melting the polymer particles with a second solvent (S50).

2. The method of claim 1, wherein the polymer particles are a non-crosslinked polymer.

3. The method of claim 1, wherein the polymer particles are selected from the group of consisting of styrene-butadiene rubber (SBR), polybutadiene rubber, polychloroprene (neoprene), nitrile rubber, acryl rubber, fluorinated rubber (FKM), polyvinyl chloride (PVC), polystyrene, polymethylmethacrylate (PMMA), acrylonitrile-butadiene-styrene (ABS), polyvinylidene fluoride, polyvinyl fluoride, polytetrafluoroethylene (PTFE), polyvinyl acetate or a copolymer thereof, vinylacetate-ethylene copolymer, and a mixture thereof.

4. The method of claim 1, wherein the polymer particles have a diameter of 0.1 to 1 µm.

5. The method of claim 1, wherein the polymer resin is an engineering plastic resin with high heat-resistance.

6. The method of claim 1, wherein the second organic solvent is a solvent capable of melting the polymer particles selectively.

* * * * *